(12) United States Patent
Hartung

(10) Patent No.: US 7,845,371 B2
(45) Date of Patent: Dec. 7, 2010

(54) GAS CONNECTOR SOCKET WITH COVER

(75) Inventor: Karl-Heinz Hartung, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 916 days.

(21) Appl. No.: 11/682,227

(22) Filed: Mar. 5, 2007

(65) Prior Publication Data

US 2007/0209725 A1 Sep. 13, 2007

(30) Foreign Application Priority Data

Mar. 6, 2006 (DE) .................. 10 2006 010 565

(51) Int. Cl.
*F16L 55/10* (2006.01)

(52) U.S. Cl. .................. 138/89; 138/89.1; 251/149.8; 137/360

(58) Field of Classification Search .................. 138/89, 138/89.1–89.4; 137/360, 329.3, 329.4; 251/149.1, 251/149.3, 149.8, 149.9
See application file for complete search history.

(56) References Cited

U.S. PATENT DOCUMENTS

| | | | | |
|---|---|---|---|---|
| 3,532,101 A | * | 10/1970 | Snyder, Jr. .................. | 137/75 |
| 6,945,511 B2 | * | 9/2005 | Schulze .................. | 251/149.8 |
| 7,040,341 B2 | * | 5/2006 | Albrecht et al. .................. | 137/360 |
| 7,314,210 B2 | * | 1/2008 | Albrecht et al. .................. | 251/149.8 |
| 7,527,071 B2 | * | 5/2009 | Albrecht et al. .................. | 137/614.19 |
| 2004/0065859 A1 | * | 4/2004 | Schulze .................. | 251/149.6 |
| 2008/0078451 A1 | | 4/2008 | Albrecht et al. .................. | 137/329.3 |
| 2008/0099709 A1 | * | 5/2008 | Albrecht et al. .................. | 251/149.8 |

FOREIGN PATENT DOCUMENTS

| | | |
|---|---|---|
| DE | 100 61 653 C1 | 1/2002 |
| DE | 201 17 126 U1 | 3/2003 |
| DE | 10 2004 028 039 | 4/2005 |
| WO | 02/48592 A1 | 6/2002 |

* cited by examiner

*Primary Examiner*—Patrick F Brinson
(74) *Attorney, Agent, or Firm*—Proskauer Rose LLP

(57) ABSTRACT

The invention relates to a gas connector socket with at least one inlet port for connecting a locally fixated gas supply line, with at least one outlet port for connecting a gas connector plug, with a housing receiving the at least one outlet port, and with at least one cover located on the housing, wherein the cover has a front side visible from the outside, in which the technical object of preventing the penetration of foreign objects into the outlet port, and the access to the gas path without particular know-how, and providing a simple and very compact embodiment, is achieved by the cover having on its backside at least one locking element for interlocking the cover with an element connected to the housing and the locking element having an operating surface accessible from the outside for unlocking the cover.

11 Claims, 5 Drawing Sheets

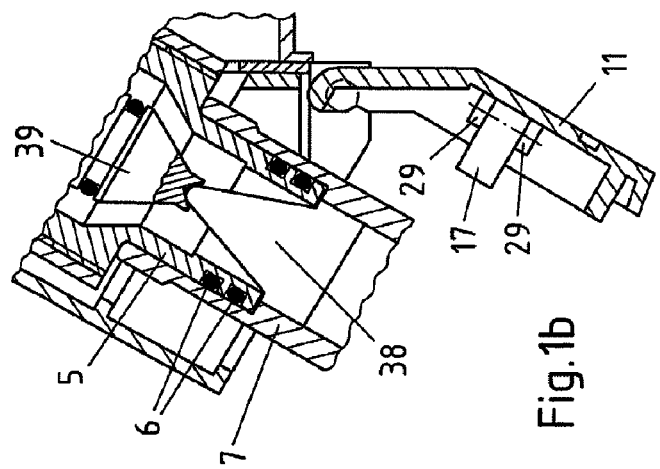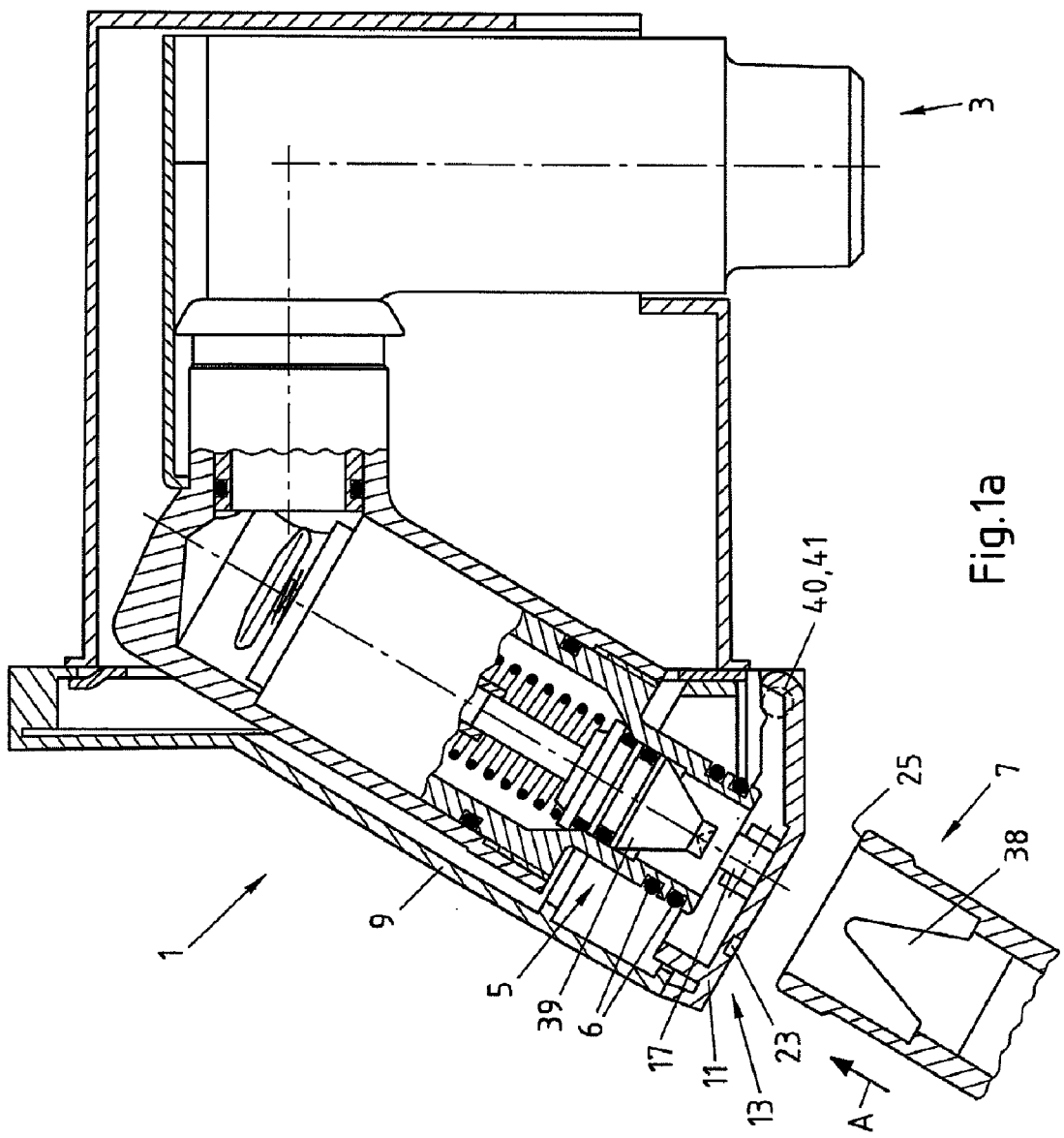

GAS CONNECTOR SOCKET WITH COVER

FIELD OF THE INVENTION

The invention relates to a gas connector socket with at least one intake port for connecting a locally fixated gas supply line, with at least one outlet port for connecting a gas connector, with a housing receiving at least one outlet port and at least one cover located thereon, wherein the cover has a front side which is visible from the outside.

Gas connector sockets facilitate the connection and operation of mobile gas equipment, e.g. gas stoves, laundry driers, outdoor heaters, and outdoor grills.

General requirements for gas connector sockets include that the connection of a gas connector plug can be established and disengaged by the user in a safe manner as often as desired.

Furthermore, the regulations of testing institutes, e.g. DVGW-VP-635-1 of the German gas and water plumbing association are applicable, which specify the design of gas connector sockets, in which the insertion of a foreign object into the outlet port, or the access to the gas path is not possible without specific know-how.

The gas carrying part of the gas connector is thereby provided with known measures for allowing and preventing of the gas flow, e.g. gas flow monitors and/or thermal cut-off devices. Here typically various embodiments of valve bodies and other adjustment devices and sealing components are being used.

BACKGROUND OF THE INVENTION

Gas connector sockets of the above mentioned type are known e.g. from EP 1 342 030, wherein the gas connectors disclosed therein protect an outlet port through a slide element. The slide element is unlocked by means of the gas connector plug. With a sliding motion the slide element can be subsequently moved together with the gas connector plug into a position in which the joining of the outlet port and the gas connector plug is enabled.

In another embodiment, the protection of the outlet port is accomplished through two rotatable flaps provided in the housing of the gas connector.

Another embodiment of a gas connector socket is disclosed in DE 10 2004 028 039. The design of the gas connector, which is substantially identical with the above embodiment, is supplemented therein with a mechanical switch element, enabling the sliding of the slide element only in a switched-off state. This shall provide an additional safety element.

Gas connector sockets of the concealed and surface mounting type are known. Furthermore, the connection axis of the outlet port can have any connection angle.

In the above gas connector sockets it is disadvantageous that the avoidance of the insertion of foreign objects into the outlet port of the gas connector socket and of the access to the gas path without specific know-how can only be accomplished through elaborate embodiments comprising many and complicated components and through large embodiments.

SUMMARY OF THE INVENTION

The invention has the technical object to prevent the insertion of foreign objects into the outlet port and the access to the gas path without specific know-how and to provide a simple and very compact type of a gas connector socket.

According to the invention the technical object is accomplished by the cover having on its backside at least one locking element for interlocking the cover with an element connected to the housing and the locking element having an operating surface which is accessible from the outside for unlocking the cover.

According to the invention it was thus recognized that the arrangement of at least one locking element at the backside of the cover provides a simple and compact embodiment and fulfills the requirements of the technical object.

It is an advantage that by arranging at least one locking element on the backside of the cover and by the operating surface of the locking element being accessible from outside, i.e. from the front side of the cover, a combination of locking and covering is provided.

In its non-operated position, the locking element is in its locking position. Through operating the locking element via its operating surface, it is moved into its unlocked position.

In a particularly preferred embodiment, the cover has at least two locking elements. Thereby, the unlocking of the cover is further assured, since unlocking requires the operation of at least two operating surfaces, independent from each other.

Another embodiment is characterized in that the cover has a key contour on its front face, wherein the key contour is a recess adapted to the connector contour of the gas connector plug. The key contour has a respective pass-through towards the backside of the cover for a respective locking element. One respective operating surface of a locking element is located in the area of one respective pass-through, in particular in one respective pass-through of the key contour.

Thereby a further safeguard of the cover against unlocking is provided. In the above mentioned embodiment the operation of the locking element by means of the operating surface, in a particularly advantageous manner, can only be performed with difficulty, in particular not at all without the gas connector plug. The gas connector plug thus has the function of a key for unlocking the cover.

Furthermore, the locking element can be arranged on the cover by means of a support. Thereby, a simple and effective way of mounting the locking element on the cover is provided.

Furthermore, through a spring element located on the locking element for resetting the locking element, a possibility can be provided that the locking element reverses again into its locking position after being operated, thereby locking the cover.

In a particularly preferred manner, the spring element is integrally provided with the locking element. Thereby, the locking element and the spring element can be made from one piece in the same manufacturing step.

In one embodiment the element connected to the housing is a protrusion of the housing. Thereby, the cover can be interlocked with the housing itself. Thereby, a locking to the housing can be provided in a simple manner.

Furthermore, the element connected to the housing can be a protrusion at the outlet port. This is an additional possibility for facilitating the locking of the cover, wherein the protrusion can be provided directly in the manufacture of the outlet port, so that the housing does not have to be sized for the locking function.

Furthermore, the element connected to the housing can be a protrusion on a valve body located in the outlet port. Thereby, the cover can be unlocked on the one hand and on the other hand the valve body is secured through the cover in addition to a usual spring force in its gas cut-off position.

The cover can be provided in the unlocked position without a connection to the housing. The cover can also be connected to the housing, e.g. through a chain.

In a particularly preferred embodiment the cover is connected to the housing through a bearing in a pivotable manner. Thereby, the availability of the cover for protecting the outlet port is assured at any time.

Eventually, the cover can be provided in a self-closing and/or self-locking manner through a spring element. Hereby, the cover can close and/or lock by itself when no gas connector plug is present.

BRIEF DESCRIPTION OF THE FIGURES

Subsequently, specific embodiments of the invention will be described in detail with reference to the attached drawing, showing in:

FIG. 1 an embodiment of a gas connector socket with a locked and unlocked cover, FIG. 2 a detailed view of the front- and backside of a cover according to the invention, FIG. 3 a detailed view of an embodiment of locking elements and their function, FIG. 4 a detailed view of a further embodiment of locking elements and their function, FIG. 5 a detailed view of an alternative embodiment of locking elements and their function.

DETAILED DESCRIPTION

Figure 2A:
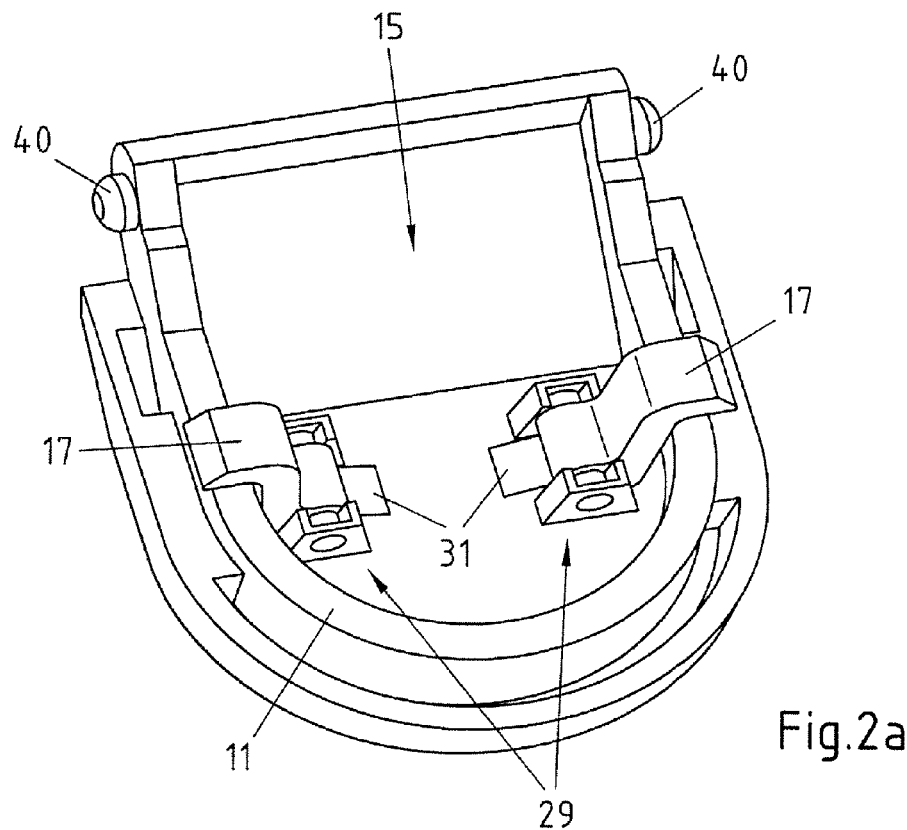

Initially, the objects shown in the figures are being described. Subsequently, the process for unlocking and locking the cover is described.

In FIG. 1, an embodiment of a gas connector socket 1 with a locked and unlocked cover 11 is shown.

FIG. 1a shows the gas connector socket 1 with an inlet port 3 for connecting a locally fixated gas supply line, an outlet port 5 for connecting a gas connector plug 7, a housing 9 receiving the outlet port 5, and a cover 11 located on the housing 9 in its locked position, the cover 11 being provided with a front side 13 visible from the outside.

In particular, in the embodiment shown the cover 11 is pivotably connected to the housing 9 by means of a pivot 40 and is provided with a spring element 41 for automatically closing and/or locking of the cover 11.

The gas connector plug 7 has a connector contour 25 and a sheet metal element 38, wherein the sheet metal element 38 is located within the gas connector plug. The sheet metal element 38 only has to have a small thickness, e.g. a few millimeters, in particular 1 mm. Thereby, the gas can pass by the sheet metal element 38 without major losses, when the gas connector plug 7 is completely connected to the outlet port 5.

Furthermore, the outlet port 5 has seals 6 for sealing relative to the gas connector plug 7.

In FIG. 1b, the cover 11 is shown unlocked and pivoted open. The gas connector plug 7 is completely inserted into the outlet port 5. The sheet metal element 38 presses onto the valve body 39, so that the gas flow is opened and can flow past the sheet metal element 38. The seals 6 then seal the gas connector 7 relative to the connection port 5.

In FIG. 2, a detailed view of the backside 15 and the front side 13 of the cover 11 is shown.

FIG. 2a shows, that the cover 11 has two locking elements 17 on its backside 15 for locking the cover 11. The locking elements 17 have operating surfaces 21 accessible from the outside for unlocking the cover 11 as shown in FIG. 2b.

Figure 2B:
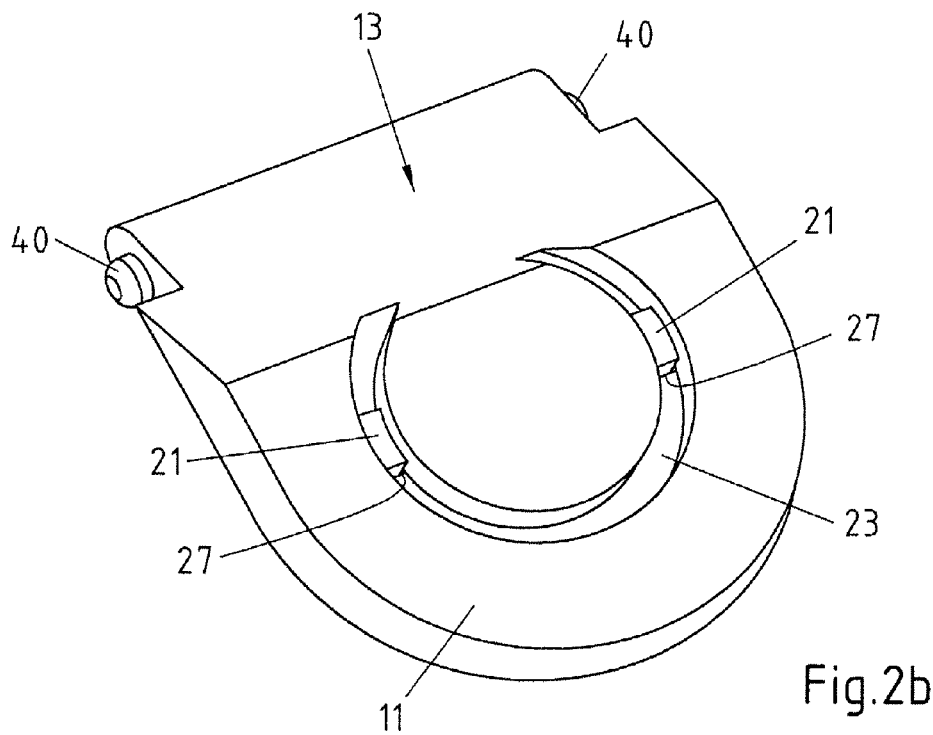

Furthermore, FIG. 2b shows that the cover 11 has a key contour 23 on its front side 13, wherein the key contour 23 is a recess adapted to the connection contour 25 of the gas connector plug 7. The key contour 23 has two pass-throughs 27 towards the backside 15 of the cover 11.

A respective operating surface 21 of a locking element 17 is located in the area of a respective pass-through 27, in particular in a respective pass-through 27 of the key contour 23.

Furthermore, each of the locking elements 17 has a support 29 and spring elements 31 formed integrally with the locking elements 17 for resetting the locking elements 17.

FIGS. 3 through 5 show detailed views of various embodiments of the locking elements 17 and their function.

Figure 3A:
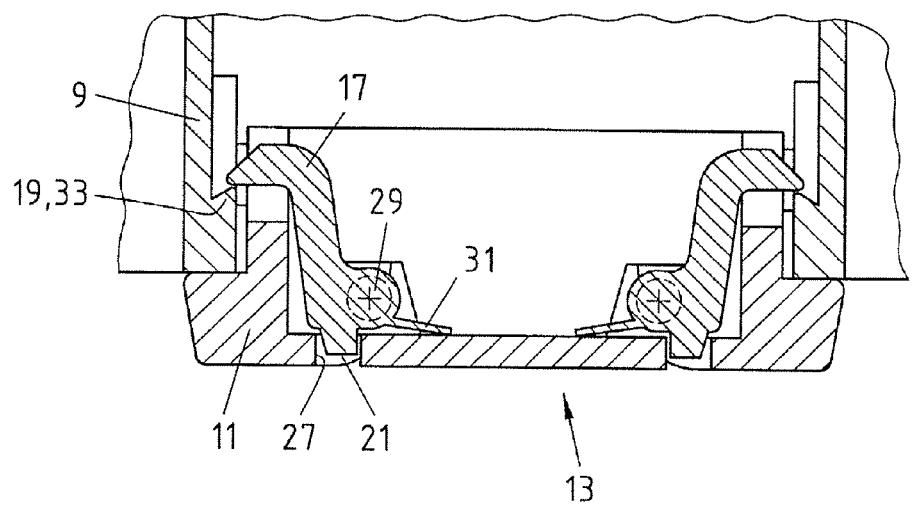

FIG. 3a shows that a protrusion 23 is located at the housing 9 for locking the cover 11. For this purpose the locking elements 17 engage behind the protrusion 33.

Figure 4A:
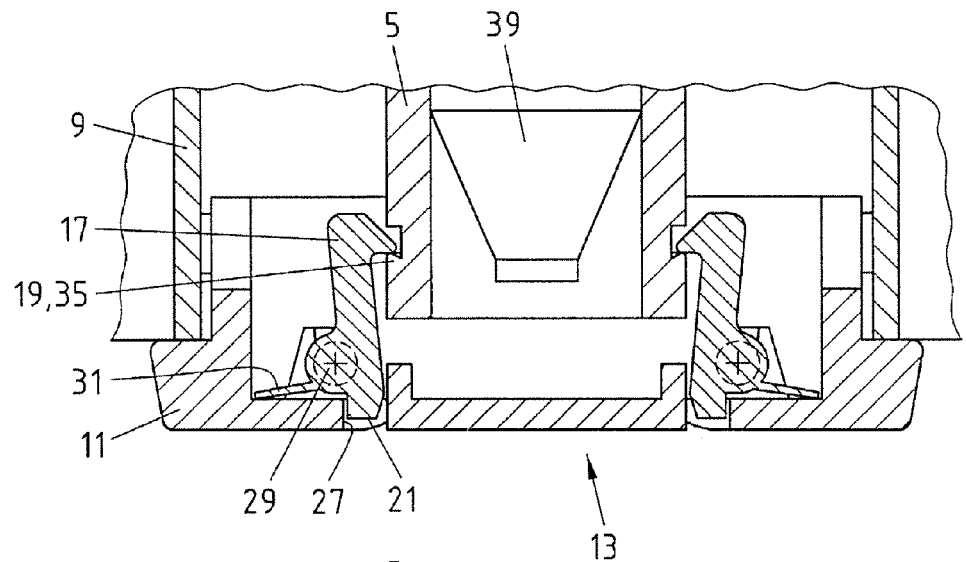

FIG. 4a shows an alternative wherein a protrusion 35 is located at the outlet port 5, which is being used for locking the cover 11, with the locking elements engaging behind the protrusion 35.

Figure 5A:
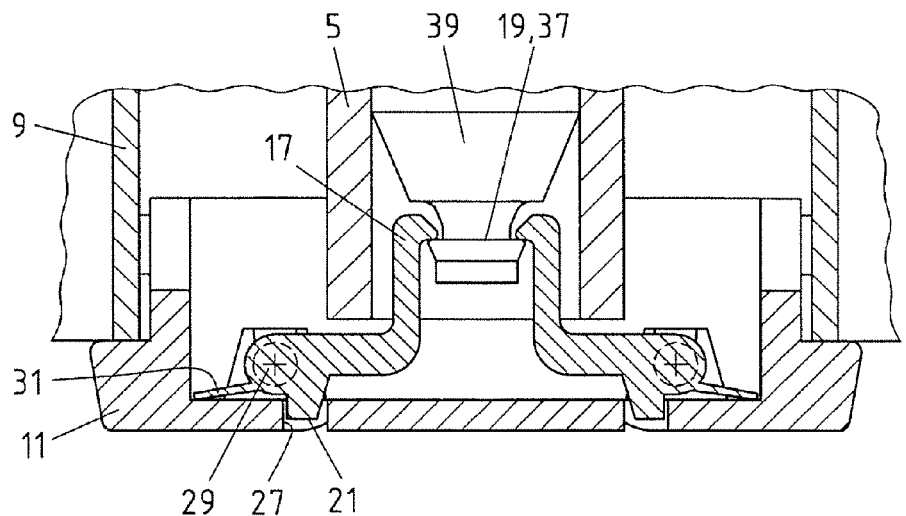

FIG. 5a shows a further alternative, in which a protrusion 37 is located on a valve body 39 located in the outlet port 5, which in turn, is used for locking the cover 11.

Subsequently, the process of unlocking and locking the cover 11 shall be described with reference to the above mentioned figures.

Beginning with a locked state of the cover 11, as shown in FIGS. 1a and 3a, the gas connector plug 7 is placed onto the cover 11 in the direction of the arrow A. Thereby, the connector contour 25 of the gas connector plug 7 reaches into the key contour 23 of the cover 11. Thereby, the connector contour 25 is brought in contact with operating surfaces 21 of the locking elements 17.

Figure 3B:
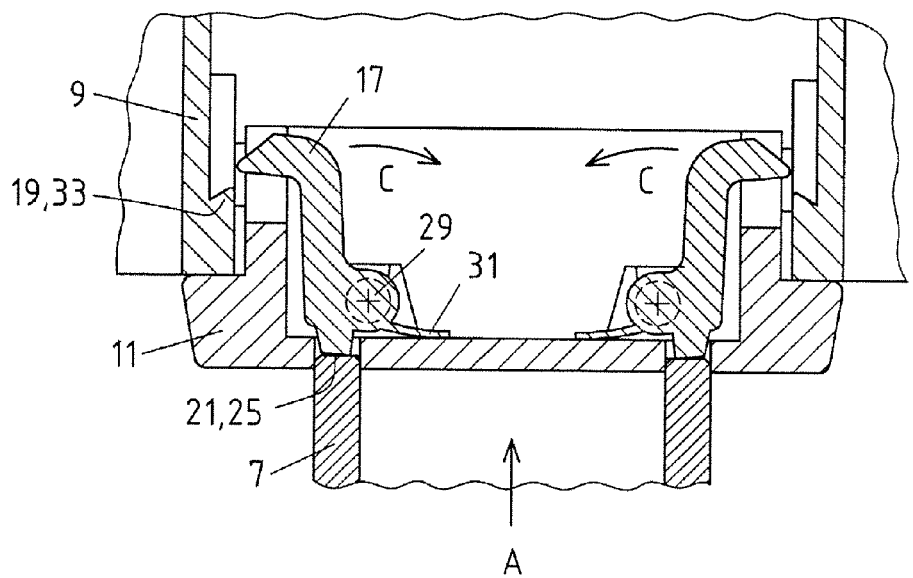

FIG. 3b shows that further motion of the gas connector plug 7 in the direction of the arrow A leads to the locking elements 17 moving around the axis of the support 29 in the direction of the arrow C. Thereby, the locking elements 17 are moved from their locking position and do not engage behind the housing protrusion 33 any more. Furthermore, the spring element 31 is being loaded.

The cover 11 is unlocked now and can be pivoted around the axis of the pivot 40, thus releasing the outlet port 5 and loading the spring element 41.

As soon as the gas connector plug 7 is removed from the key contour 23 of the cover 11, the loaded spring element 31 leads to a motion of the locking elements 17 against the direction of the arrow C, and to a resetting of the locking elements 17 into their locking position.

The gas connector 7 can now be connected to the outlet port 5 by placing it onto the outlet port 5 again in the direction of the arrow A.

Initially the seals 6 then seal the gas connector plug 7 relative to the outlet port 5. Only after establishing the seal, and further motion of the gas connector 7 in the direction of the arrow A, the sheet metal 38 located in the gas connector 7 presses onto the valve body 39, thereby opening the gas path as shown in FIG. 1b.

Figure 4B:
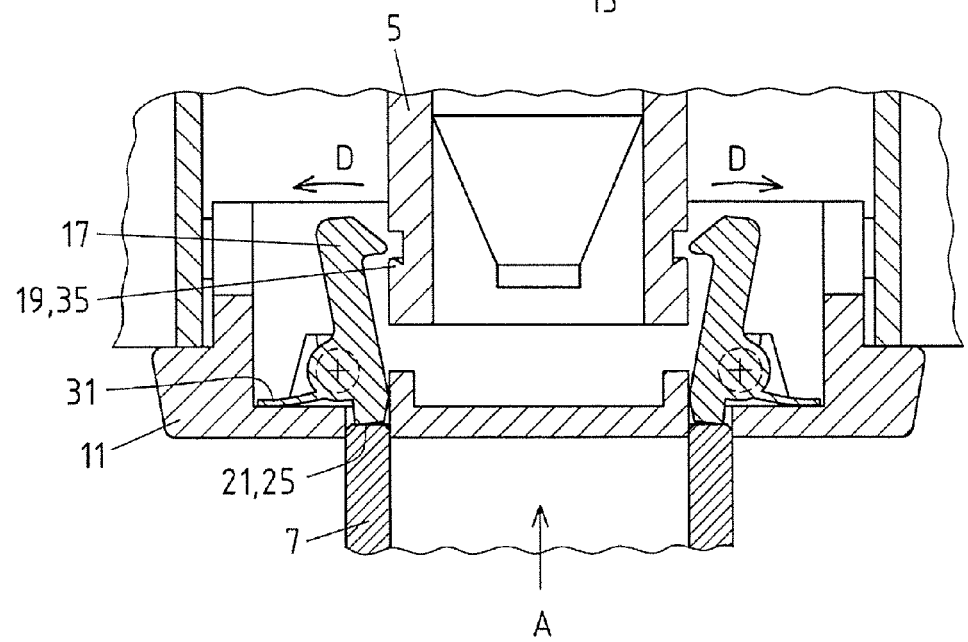

A further embodiment is shown in FIG. 4b. When the gas connector 7 is moved in the direction of the arrow A into the key contour 23 of the cover 11, the locking elements 17 rotate in the direction of the arrow D, so that they no longer engage behind the protrusion 35 at the outlet port 5. Thereby, the cover 11 is unlocked and can release the connection port as described above.

A repositioning of the locking elements 17 in FIG. 4b is again performed against the direction of the arrow D through the loaded spring elements 31.

Figure 5B:
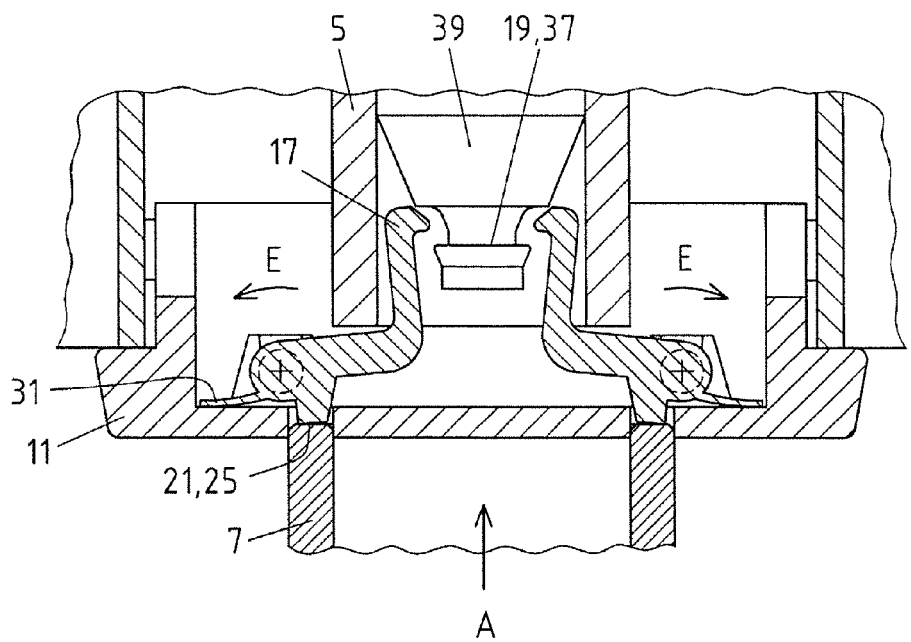

In FIG. 5b, an alternative embodiment of the locking elements 17 is shown. Here the locking elements 17 are moved in the direction of the arrow E through inserting the gas connector plug 7 into the key contour 23 in the direction of the arrow A, so that they do not engage behind the protrusion 37 in the valve body 39 any more. Again, the cover 11 is unlocked and the procedure can be performed as explained above.

In order to close the cover 11, initially, the gas connector is removed from the outlet port, against the direction of arrow A. In doing so the sheet metal element 38 is initially removed from the valve body 39, so that the valve body 39 interrupts the gas flow. This occurs before the seals 6 lose contact with the gas connector plug 7. Thereafter, the gas connector plug 7 is moved further against the direction of the arrow A and completely removed from the gas connector socket 1.

The cover 11 is then pivoted in the direction of its initial position shown in FIG. 1a for covering the outlet port 5 by means of the loaded spring element 41.

Figure 3C:
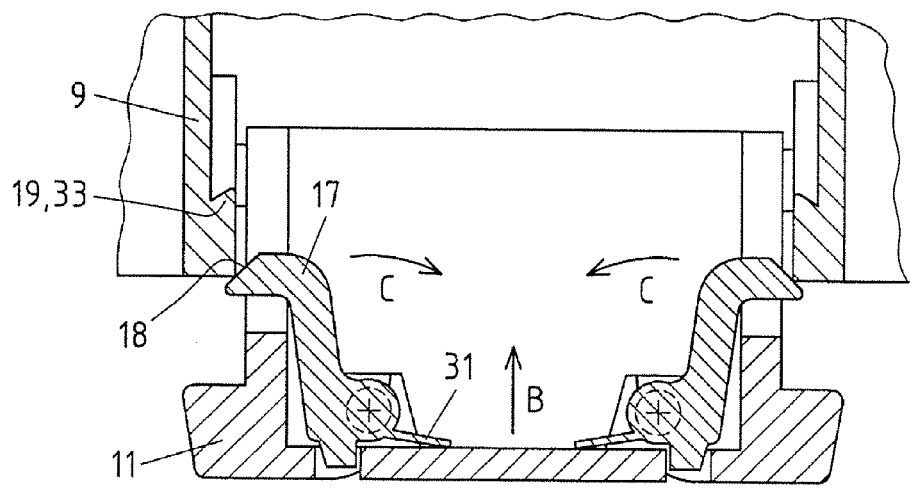

In the embodiment shown in FIG. 3c, while closing the cover 11, the locking elements 17 are being moved at the first contact with the housing 9 by means of a slant 18 in the direction of the arrow C, when the cover 11 moves in the direction of arrow B. Thereby, the spring elements 31 are being loaded. As soon as the cover 11 is in its final position, through the action of the loaded spring elements 31 the locking elements 17 engage behind the protrusion 33 of the housing 9 and thus effect locking of the cover 11.

Figure 4C:
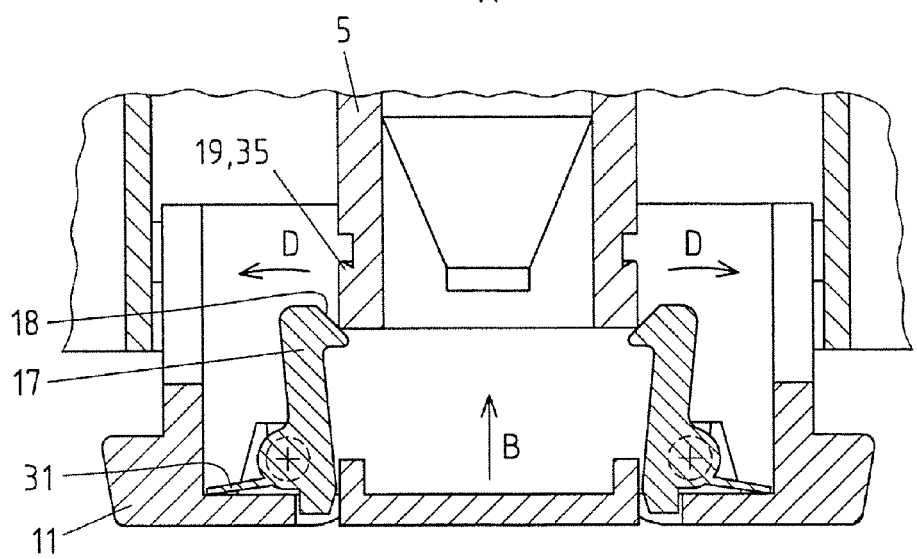

In the embodiment shown in FIG. 4c the locking of the cover 11 is performed in a similar manner, wherein a first contact with the outlet port 5 moves the locking elements 17 in the direction of the arrow D, when the cover 11 moves in direction of the arrow B. Subsequently, the loaded spring element 31 leads to engagement behind the protrusion 35.

Figure 5C:
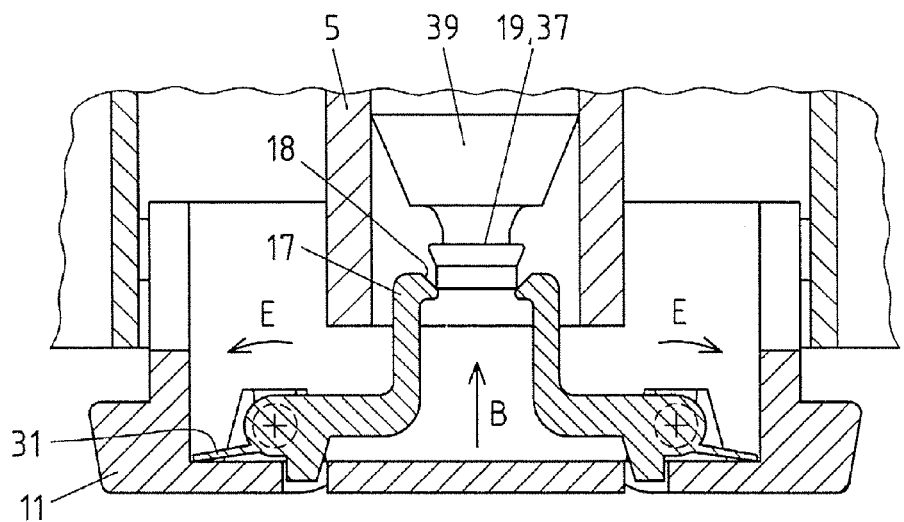

In the alternative shown in FIG. 5c the locking elements 17 are moved in the direction of the arrow E through the first contact with the valve body 39, while the cover 11 moves in the direction of the arrow B and, subsequently, engages behind the protrusion 37, induced by the loaded spring elements 31. In this embodiment it is to be emphasized that the force required for moving the locking elements 17 in the direction of the arrow E is much less than the force required for moving the valve body 39 into a gas releasing position.

The invention is certainly not limited to the previously mentioned embodiments; in particular, through a selection of the materials of the housing and the cover, the gas connector can be adapted for various applications. For example, plastics, but also metals, can be used. Also, glass elements, e.g. for particularly decorative embodiments, can be used.

Furthermore, the gas connector socket can be supplemented with a further safety measure. For example, the cover can in an open state secure the gas connector in a position connected to the outlet port in order to avoid an unintentional disconnection of the gas connector plug. In particular the cover can automatically engage behind a protrusion at the gas connector plug, when the cover is provided in a self-closing manner through a spring element.

Depending on the requirements, the gas connector socket can be provided in a concealed or surface mounted version, wherein the outlet port can have any desired connection angle. In particular, different connection angles can be selected, depending on an angled or straight embodiment of the gas connector plug.

Furthermore, the cover can be provided with additional seals so that it can protect the interior of the housing against the intake of humidity and/or dust and/or dirt. Such an embodiment is therefore advantageous for the use of a gas connector socket outside of enclosed spaces or for industrial applications.

The invention claimed is:

1. A gas connector socket with at least one inlet port for connecting a locally fixated gas supply line, with at least one outlet port for connecting a gas connector plug, with a housing receiving the at least one outlet port, and with at least one cover arranged at the housing, the cover having a front side visible from the outside, wherein the cover has at least one locking element on its backside for locking the cover with an element connected to the housing, and that the at least one locking element has an operating surface accessible from the outside for unlocking the cover, wherein the cover has a key contour on its front side, wherein the key contour is a recess adapted to a connector contour of the gas connector plug, and wherein the key contour has a respective pass-through to the backside of the cover for each locking element.

2. A gas connector socket according to claim 1, wherein the cover has at least two locking elements.

3. A gas connector socket according to claim 1, wherein the respective operating surface of a locking element is located in an area of the respective pass-through.

4. A gas connector socket according to 1, wherein the locking element is arranged on the cover by means of a support.

5. A gas connector socket according to claim 1, wherein at the locking element a spring element is located for resetting the locking element.

6. A gas connector socket according to claim 5, wherein the spring element is provided integrally with the locking element.

7. A gas connector socket according to claim 1, wherein the element connected to the housing is a protrusion of the housing.

8. A gas connector socket according to claim 1, wherein the element connected to the housing is a protrusion on the outlet port.

9. A gas connector socket according to claim 1, wherein the element connected to the housing is a protrusion on a valve body located on the outlet port.

10. A gas connector socket according to claim 1, wherein the cover is connected to the housing through a pivot in a pivotable manner.

11. A gas connector socket according to claim 1, wherein the cover is provided in a self-locking manner through a spring element.

* * * * *